(12) United States Patent
Aikawa et al.

(10) Patent No.: US 9,854,119 B2
(45) Date of Patent: Dec. 26, 2017

(54) IMAGE READING APPARATUS, IMAGE READING METHOD, AND NON-TRANSITORY COMPUTER READABLE MEDIUM

(71) Applicant: FUJI XEROX CO., LTD., Tokyo (JP)

(72) Inventors: Kiyofumi Aikawa, Kanagawa (JP); Masaki Hachisuga, Kanagawa (JP); Takashi Hiramatsu, Kanagawa (JP); Kazuya Fukunaga, Kanagawa (JP); Hideki Moriya, Kanagawa (JP); Michio Kikuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/982,313

(22) Filed: Dec. 29, 2015

(65) Prior Publication Data

US 2016/0352957 A1    Dec. 1, 2016

(30) Foreign Application Priority Data

Jun. 1, 2015  (JP) ................. 2015-111548

(51) Int. Cl.
*H04N 1/387* (2006.01)
*H04N 1/053* (2006.01)
*H04N 1/12* (2006.01)
*H04N 1/193* (2006.01)

(52) U.S. Cl.
CPC ............ *H04N 1/053* (2013.01); *H04N 1/121* (2013.01); *H04N 1/193* (2013.01); *H04N 1/3876* (2013.01); *H04N 2201/0081* (2013.01); *H04N 2201/04743* (2013.01)

(58) Field of Classification Search
None
See application file for complete search history.

(56) References Cited

U.S. PATENT DOCUMENTS

| 2009/0195843 A1* | 8/2009 | Satoh | H04N 1/03 358/475 |
| 2012/0177302 A1* | 7/2012 | Habuka | H04N 1/3876 382/274 |
| 2013/0286451 A1* | 10/2013 | Verhaegh | H04N 1/1903 358/521 |

FOREIGN PATENT DOCUMENTS

| JP | 2010-141558 A | 6/2010 |
| JP | 2013-013048 A | 1/2013 |

* cited by examiner

*Primary Examiner* — John Wallace
*Assistant Examiner* — Michael Burleson
(74) *Attorney, Agent, or Firm* — Sughrue Mion, PLLC

(57) ABSTRACT

An image is read from a recording medium via first and second optical imaging systems disposed such that respective reading regions partially overlap each other in a principal scanning direction on a reading surface. A sum of distances over which first and second images captured by the first and second optical imaging systems, respectively, are displaced in the principal scanning direction with respect to a reference point included in a region in which the reading regions overlap each other is calculated. First and second distances, over which the first and second images are displaced in the principal scanning direction, respectively, are calculated using the sum and first and second reading angles at which the first and second optical imaging systems, respectively, read the reference point. Positions of the first image and the second image in the principal scanning direction are corrected using the first distance and the second distance, respectively.

11 Claims, 8 Drawing Sheets

FIG. 12A
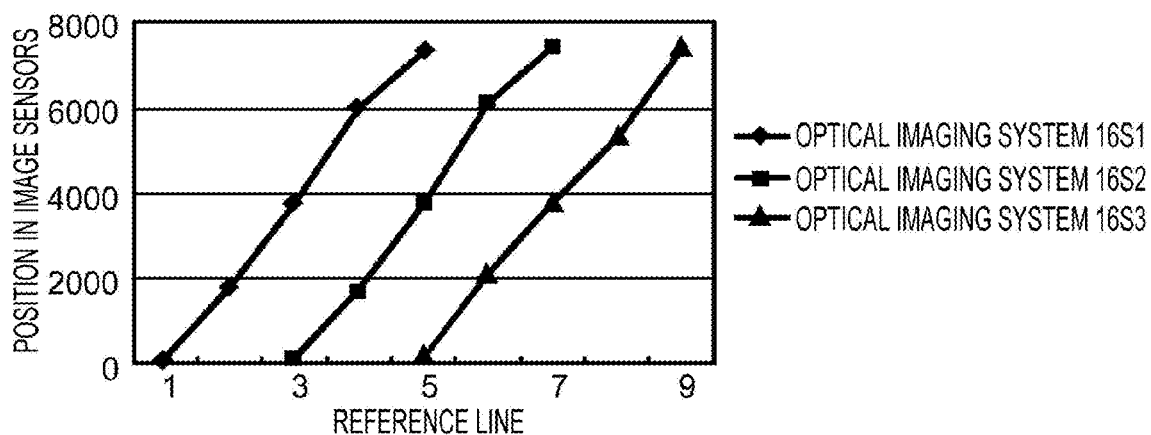
FIG. 12B
FIG. 13
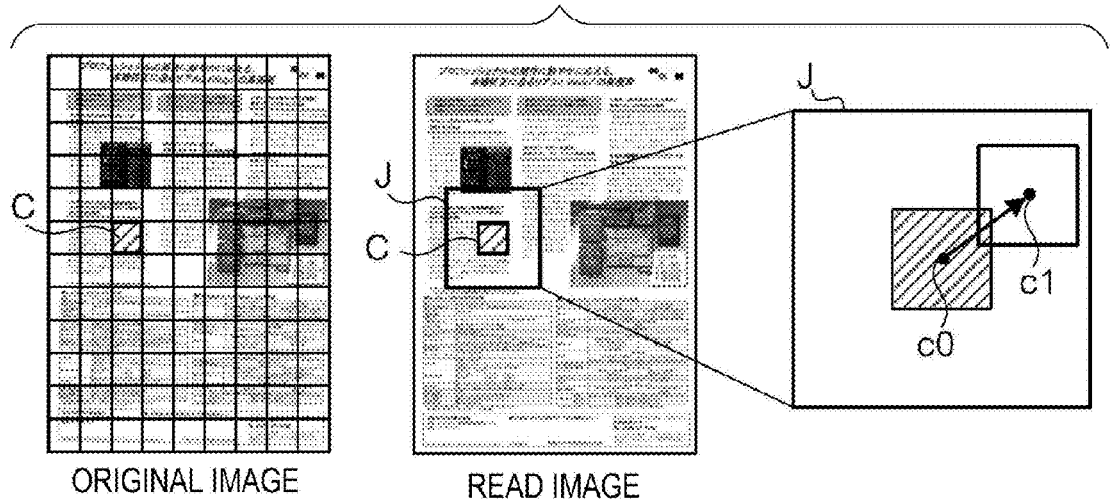

IMAGE READING APPARATUS, IMAGE READING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-111548 filed Jun. 1, 2015.

BACKGROUND (i) Technical Field

The present invention relates to an image reading apparatus, an image reading method, and a non-transitory computer readable medium.

(ii) Related Art

There is known an image reading apparatus in which plural image sensors are disposed in the principal scanning direction and images captured by the image sensors are linked to optically read an object to be imaged.

SUMMARY

According to an aspect of the present invention, there is provided an image reading device including: a reading unit that reads an image from a recording medium via a first optical imaging system and a second optical imaging system, the first optical imaging system and the second optical imaging system being disposed such that respective reading regions partially overlap each other in a principal scanning direction on a reading surface of the image reading apparatus; a first calculation unit that calculates a sum of a distance over which a first image captured by the first optical imaging system is displaced in the principal scanning direction with respect to a reference point and a distance over which a second image captured by the second optical imaging system is displaced in the principal scanning direction with respect to the reference point, the reference point being included in a region in which the reading regions overlap each other on the reading surface; a second calculation unit that calculates a first distance, over which the first image is displaced in the principal scanning direction, and a second distance, over which the second image is displaced in the principal scanning direction, using the sum calculated by the first calculation unit, a first reading angle at which the first optical imaging system reads the reference point, and a second reading angle at which the second optical imaging system reads the reference point; and a correction unit that corrects a position of the first image in the principal scanning direction using the first distance calculated by the second calculation unit, and that corrects a position of the second image in the principal scanning direction using the second distance calculated by the second calculation unit.

BRIEF DESCRIPTION OF THE DRAWINGS

An exemplary embodiment of the present invention will be described in detail based on the following figures, wherein:

FIGS. 12A and 12B illustrate position data; and

FIG. 13 illustrates a scene of use of the image reading apparatus.

DETAILED DESCRIPTION

Figure 1:
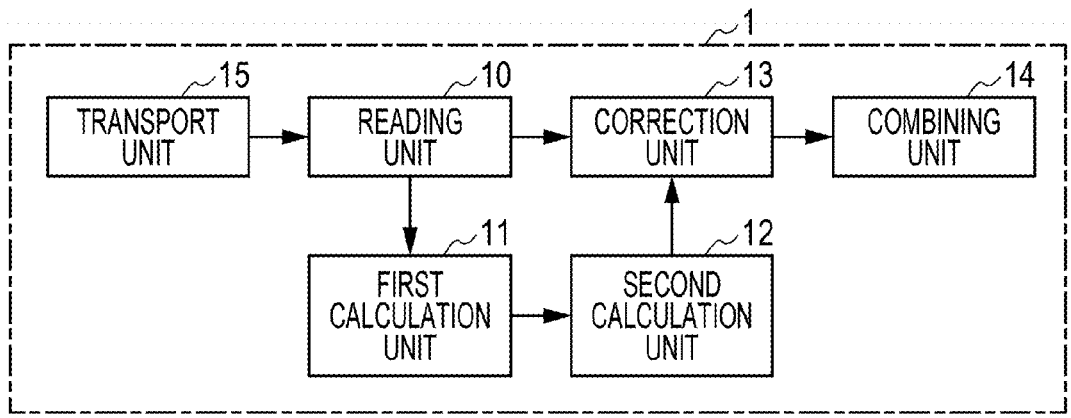
FIG. 1 illustrates the functional configuration of an image reading apparatus.

FIG. 1 illustrates the functional configuration of an image reading apparatus 1 according to an exemplary embodiment of the present invention. The image reading apparatus 1 includes a reading unit 10, a first calculation unit 11, a second calculation unit 12, a correction unit 13, a combining unit 14, and a transport unit 15. The reading unit 10 reads an image from a recording medium that faces a reading surface of the image reading apparatus 1. The reading unit 10 reads an image from a recording medium via a first optical imaging system and a second optical imaging system disposed such that respective reading regions of the first and second optical imaging systems partially overlap each other in the principal scanning direction on the reading surface. The first calculation unit 11 calculates the sum of the distance over which a first image captured by the first optical imaging system is displaced in the principal scanning direction with respect to a reference point and the distance over which a second image captured by the second optical imaging system is displaced in the principal scanning direction with respect to the reference point, the reference point being included in a region in which the reading regions overlap each other on the reading surface. The second calculation unit 12 calculates a first distance over which the first image is displaced in the principal scanning direction and a second distance over which the second image is displaced in the principal scanning direction. The second calculation unit 12 calculates the first distance and the second distance using the value calculated by the first calculation unit, a reading angle at which the first optical imaging system reads the reference point, and a reading angle at which the second optical imaging system reads the reference point. The correction unit 13 corrects the position of the first image in the principal scanning direction using the first distance calculated by the second calculation unit 12. The correction unit 13 also corrects the position of the second image in the principal scanning direction using the second distance calculated by the second calculation unit 12. The combining unit 14 combines the first image and the second image after being corrected by the correction unit 13. The transport unit 15 transports the recording medium with the recording medium facing the reading surface of the image reading apparatus 1.

Figure 2:
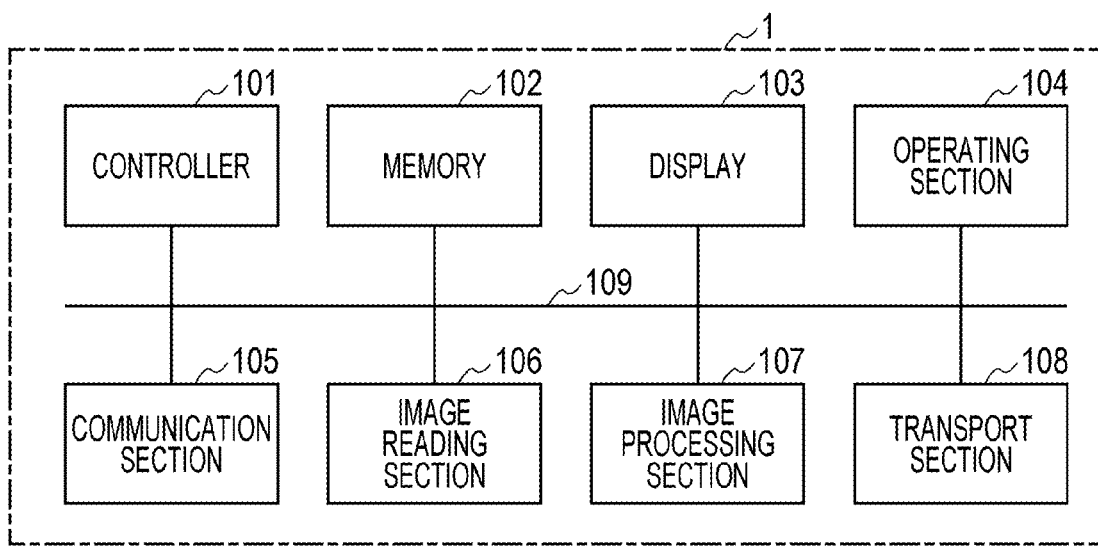
FIG. 2 is a block diagram illustrating the hardware configuration of the image reading apparatus.

FIG. 2 is a block diagram illustrating the hardware configuration of the image reading apparatus 1. The image reading apparatus 1 is a computer that includes a controller 101, a memory 102, a display 103, an operating section 104, a communication section 105, an image reading section 106, an image processing section 107, and a transport section 108. In addition, the various sections of the image reading apparatus 1 are connected to a bus 109 to exchange various data via the bus 109.

The controller 101 is a unit that controls operation of the various sections of the image reading apparatus 1. The controller 101 includes a computation processing device such as a central processing unit (CPU), and a storage medium (principal storage device) such as a read only memory (ROM) and a random access memory (RAM). The CPU reads a program stored in the ROM and the memory 102, and executes the program using the RAM as the working area. By executing the program, the controller 101 reads an image from a document to generate image data, communicates with another device via a communication line, and so forth. In the exemplary embodiment, the RAM of the controller 101 includes a line buffer that stores an image for one line read from the document.

The memory 102 is a unit that stores data. The memory 102 includes a storage medium (auxiliary storage device) such as a hard disk drive and a flash memory, and stores data received by the communication section 105, data generated by the image reading apparatus 1, and so forth. In addition, the memory 102 may include a removable storage medium (removable medium) such as a so-called memory card and a USB memory, and a unit that reads and writes data from and into the storage medium.

The display 103 includes a display device such as a liquid crystal display or an organic electroluminescence (EL) display, and a touch screen superposed on the display. A menu screen for operating the image reading apparatus 1 is displayed on the display 103 under control by the controller 101.

The operating section 104 includes an operator (such as a button and a key) for inputting data or an instruction to the image reading apparatus 1, and supplies the controller 101 with a control signal that matches the depressed operator. Input of various instructions to the image reading apparatus 1 is performed by a user by operating the touch screen of the display 103 or the operating section 104.

The communication section 105 is a unit that transmits and receives data. The communication section 105 functions as a communication interface for communication with an external device.

The image reading section 106 is a unit that reads a document and that converts the document into image data. The image reading section 106 optically reads a document, and generates image data that represent an image of the read document. The image reading section 106 supplies the generated image data to the image processing section 107.

The image processing section 107 is a unit that executes image processing on image data. In the exemplary embodiment, the image processing section 107 performs a process for correcting distortion of an image indicated by the image data read by the image reading section 106.

The transport section 108 is a unit that transports a document (an example of a recording medium) with the document facing a reading surface R. The transport section 108 includes various rollers that separate sheets of a document loaded on a document reading tray and that transport the sheets to a reading surface of the image reading section 106 (the reading surface R to be discussed later) on which the document is read, for example. The transport section 108 transports the recording medium in the sub scanning direction which crosses the principal scanning direction.

In FIG. 2, the image reading section 106 which is controlled by the controller 101 which executes a control program for controlling operation of the various sections of the image reading apparatus 1 is an example of the reading unit 10. The image processing section 107 which is controlled by the controller 101 which executes the control program is an example of the first calculation unit 11, the second calculation unit 12, the correction unit 13, and the combining unit 14. The transport section 108 which is controlled by the controller 101 which executes the control program is an example of the transport unit 15.

Figure 3:
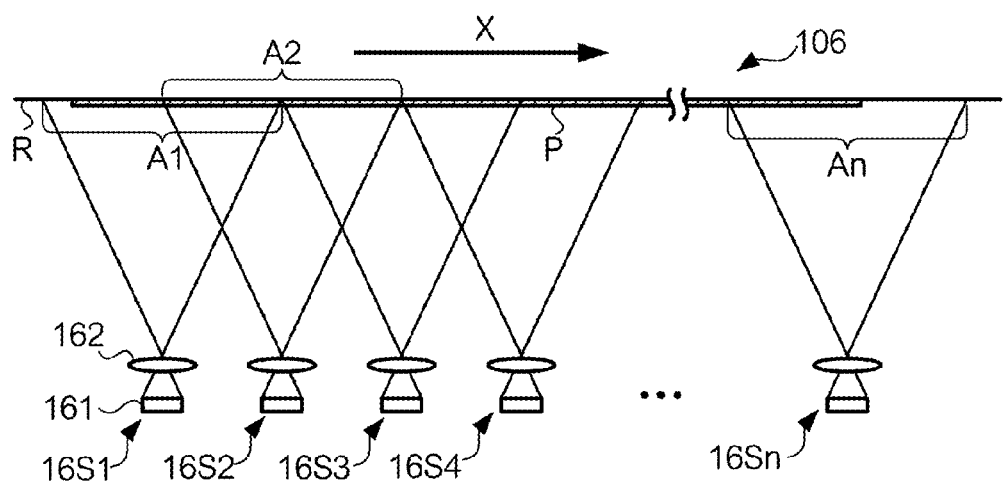
FIG. 3 illustrates the configuration of an image reading section.

FIG. 3 illustrates the configuration of the image reading section 106. The image reading section 106 includes plural optical imaging systems 16 (16S1 to 16Sn) arranged side by side in the principal scanning direction (the direction of the arrow X). The optical imaging systems 16 each include a line sensor 161 and an imaging lens 162. The line sensor 161 is an image sensor array in which plural image sensors such as charge coupled devices (CCDs) are disposed in the principal scanning direction. The line sensor 161 captures an image of a document that faces the reading surface R (hereinafter referred to as "document on the reading surface R") of the image reading section 106. In FIG. 3, a document P corresponds to the document on the reading surface R. The imaging lens 162 is a lens that optically reduces the size of an optical image reflected from the document on the reading surface R to condense light on the line sensor 161. The line sensor 161 performs a photoelectric conversion on the incident light. Besides the components illustrated in FIG. 3, the image reading section 106 includes a light source that radiates light to the reading surface R, a mirror that receives an optical image reflected from the document on the reading surface R to condense light on the line sensor 161, and so forth (none of which is illustrated).

Each of the optical imaging systems 16 is disposed such that a reading region A (A1 to An) of the optical imaging system 16 partially overlaps that of an adjacent optical imaging system 16 in the principal scanning direction on the reading surface R. The image reading apparatus 1 combines images (hereinafter referred to as "captured images") captured by the optical imaging systems 16 to acquire an image (hereinafter referred to as "line image") with no seam in the principal scanning direction. In the configuration illustrated in FIG. 3, the document on the reading surface R is occasionally spaced from the reading surface R depending on the attitude of the document at the time when the document is transported. Hereinafter, such a state is referred to as "paper floating".

Figure 4A:
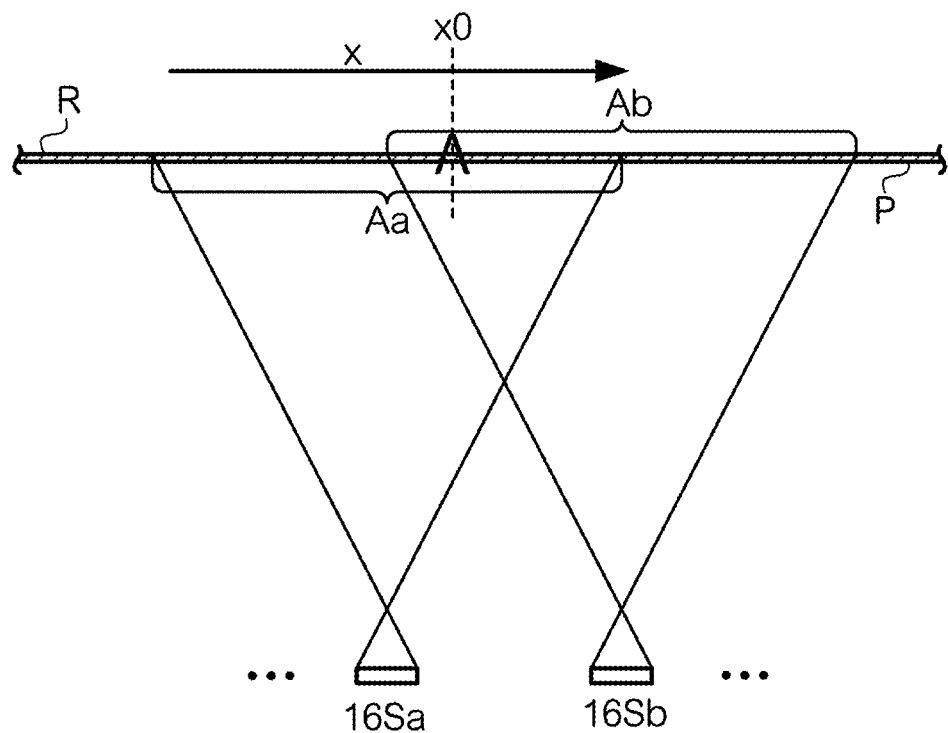
FIGS. 4A and 4B illustrate reading of a document in an ideal state with no paper floating.
Figure 4B:
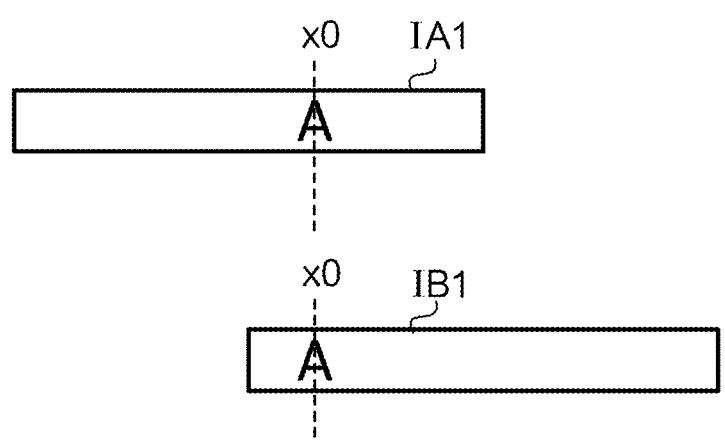

FIGS. 4A and 4B illustrate reading of a document in an ideal state with no paper floating. FIGS. 4A and 4B illustrate how an alphabetic letter "A" printed on the document P is read by the image reading section 106 at a position x0 in the principal scanning direction. In FIGS. 4A and 4B and the subsequent drawings, the imaging lens 162 is not illustrated. FIG. 4A illustrates the positional relationship between the position x0 and the optical imaging system 16. As illustrated in FIG. 4A, the position x0 is included in a region in which a reading region Aa of the optical imaging system 16Sa and a reading region Ab of the optical imaging system 16Sb overlap each other, and an image of the letter "A" is captured by each of the optical imaging system 16Sa and the optical imaging system 16Sb. FIG. 4B illustrates a captured image IA1 from the optical imaging system 16Sa and a captured image IB1 from the optical imaging system 16Sb obtained with the positional relationship illustrated in FIG. 4A. With no paper floating, the optical imaging system 16Sa and the optical imaging system 16Sb capture an image of the letter "A" using an image sensor that captures an image at the position x0, among the plural image sensors disposed in the principal scanning direction. Thus, as illustrated in FIG. 4B, the letter "A" appears at the position x0 in the captured image IA1 and the captured image IB1. In this way, in the case where a document is read with no paper floating, there is no displacement from the actual position of a document P in the captured images, and therefore no distortion is caused in the image read by the image reading section 106.

Figure 5A:
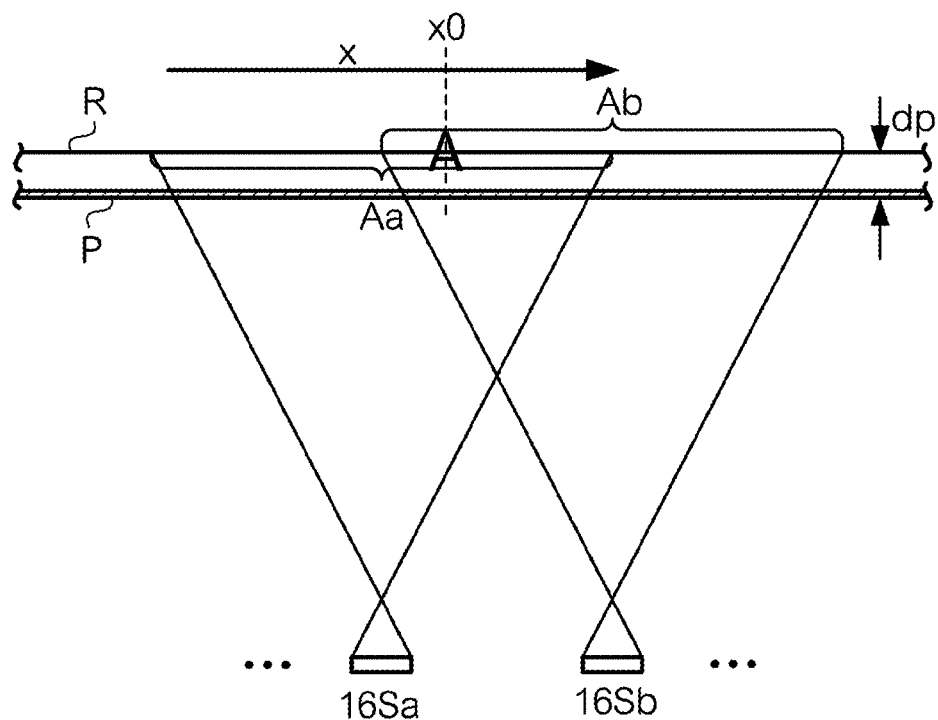
FIGS. 5A and 5B illustrate reading of a document in a state with paper floating.
Figure 5B:
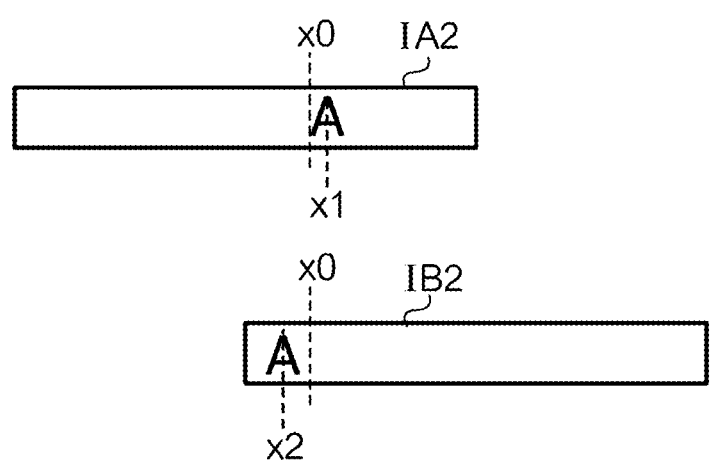

FIGS. 5A and 5B illustrate reading of a document in a state with paper floating. FIGS. 5A and 5B illustrate reading of the document P with paper floating of a distance dp (see FIG. 5A). As with FIGS. 4A and 4B, FIGS. 5A and 5B illustrate how a letter "A" printed on the document P is read by the image reading section 106 at the position x0 in the principal scanning direction. FIG. 5B illustrates a captured image IA2 from the optical imaging system 16Sa and a captured image IB2 from the optical imaging system 16Sb obtained with the positional relationship illustrated in FIG. 5A. With paper floating, the optical imaging system 16Sa and the optical imaging system 16Sb capture an image of the letter "A" using an image sensor that is different from the image sensor that captures an image at the position x0, among the plural image sensors disposed in the principal scanning direction. In FIGS. 5A and 5B, the optical imaging system 16Sa captures an image of the letter "A" using an image sensor that captures an image at a position x1 which is on the right side with respect to the position x0 in the principal scanning direction. In the captured image IA2, as illustrated in FIG. 5B, the letter "A" appears at the position x1. In addition, the optical imaging system 16Sb captures an image of the letter "A" using an image sensor that captures an image at a position x2 which is on the left side with respect to the position x0 in the principal scanning direction. In the captured image IB2, as illustrated in FIG. 5B, the letter "A" appears at the position x2. In this way, in the case where a document is read in a state with paper floating, there is displacement in the principal scanning direction from the actual position of the document P in the captured images, and therefore distortion is occasionally caused in the image read by the image reading section 106. The image reading apparatus 1 according to the exemplary embodiment corrects displacement in the captured images to prevent occurrence of distortion in the image read by the image reading section 106.

Figure 6A:
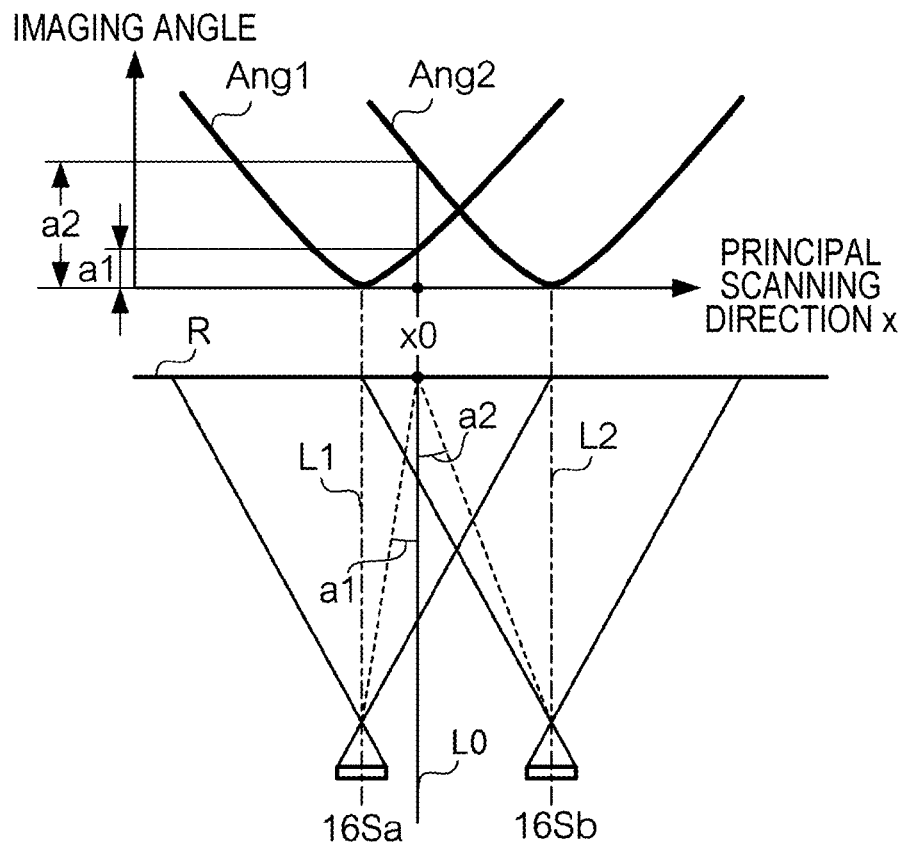
FIGS. 6A and 6B illustrate the principle of a process for correcting displacement in captured images.
Figure 6B:
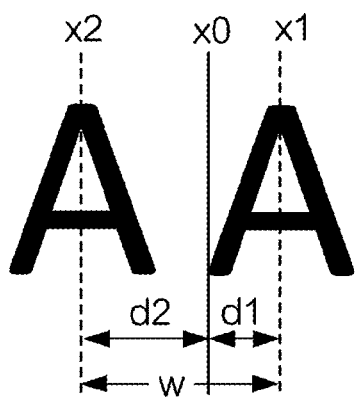

FIGS. 6A and 6B illustrate the principle of a process for correcting displacement in captured images. The image reading apparatus 1 corrects displacement in the captured images on the basis of a reading angle (hereinafter referred to as "imaging angle") at which the optical imaging system 16 reads a certain point (hereinafter referred to as "reference point") on the reading surface R. The reference point is a point that serves as the reference for calculating the sum (hereinafter referred to as "total displacement amount") of the distances over which the captured images from the adjacent optical imaging systems 16 are displaced in the principal scanning direction because of the paper floating. The reference point is set in a region in which the reading regions A of the adjacent optical imaging systems 16 overlap each other. In FIGS. 6A and 6B, the reference point is set to the position x0 (hereinafter the reference point will be referred to as "reference point x0").

FIG. 6A illustrates an imaging angle relative to a reference point. The graph illustrated in FIG. 6A represents the relationship between the position of the reading surface R in the principal scanning direction and the imaging angle of the optical imaging system 16Sa and the optical imaging system 16Sb. In the graph, Ang1 indicates the imaging angle of the optical imaging system 16Sa, and Ang2 indicates the imaging angle of the optical imaging system 16Sb. In FIG. 6A, in addition, the broken line L0 is a line that passes through the reference point x0 and that is perpendicular to the reading surface R. The dot-and-dash line L1 indicates the optical axis of the optical imaging system 16Sa. The dot-and-dash line L2 indicates the optical axis of the optical imaging system 16Sb. As illustrated in FIG. 6A, the imaging angle of the optical imaging system 16Sa and the optical imaging system 16Sb is different for each position in the principal scanning direction. In the example, the imaging angle of the optical imaging system 16Sa relative to the reference point x0 is a1, and the imaging angle of the optical imaging system 16Sb relative to the reference point x0 is a2.

FIG. 6B illustrates the relationship between the total displacement amount and the distances (hereinafter referred to as "displacement amounts") over which captured images are displaced in the principal scanning direction because of paper floating using the captured image IA2 and the captured image IB2 illustrated in FIG. 5B as examples. In FIG. 6B, w represents the total displacement amount, d1 represents the displacement amount of the captured image IA2, and d2 represents the displacement amount of the captured image IB2. As illustrated in FIG. 6B, the total displacement amount w is equal to the sum of the displacement amount d1 and the displacement amount d2. The ratio between the displacement amount d1 and the displacement amount d2 and the ratio between the imaging angle a1 and the imaging angle a2 indicated in FIG. 6A meet the relation of the following formula (1):

$$d1:d2 = a1:a2 \tag{1}$$

From the formula (1), the displacement amount d1, the displacement amount d2, the total displacement amount w, the imaging angle a1, and the imaging angle a2 meet the following formulas (2) and (3):

$$d1 = w \times \frac{a1}{a1 + a2} \tag{2}$$

$$d2 = w \times \frac{a2}{a1 + a2} \tag{3}$$

The image reading apparatus 1 calculates the displacement amount d1 and the displacement amount d2 using the relationship indicated in the formulas (2) and (3). In addition, the image reading apparatus 1 corrects displacement of the captured image IA2 using the displacement amount d1, and corrects displacement of the captured image IB2 using the displacement amount d2. A specific method of calculating the total displacement amount w will be discussed later.

Figure 7:
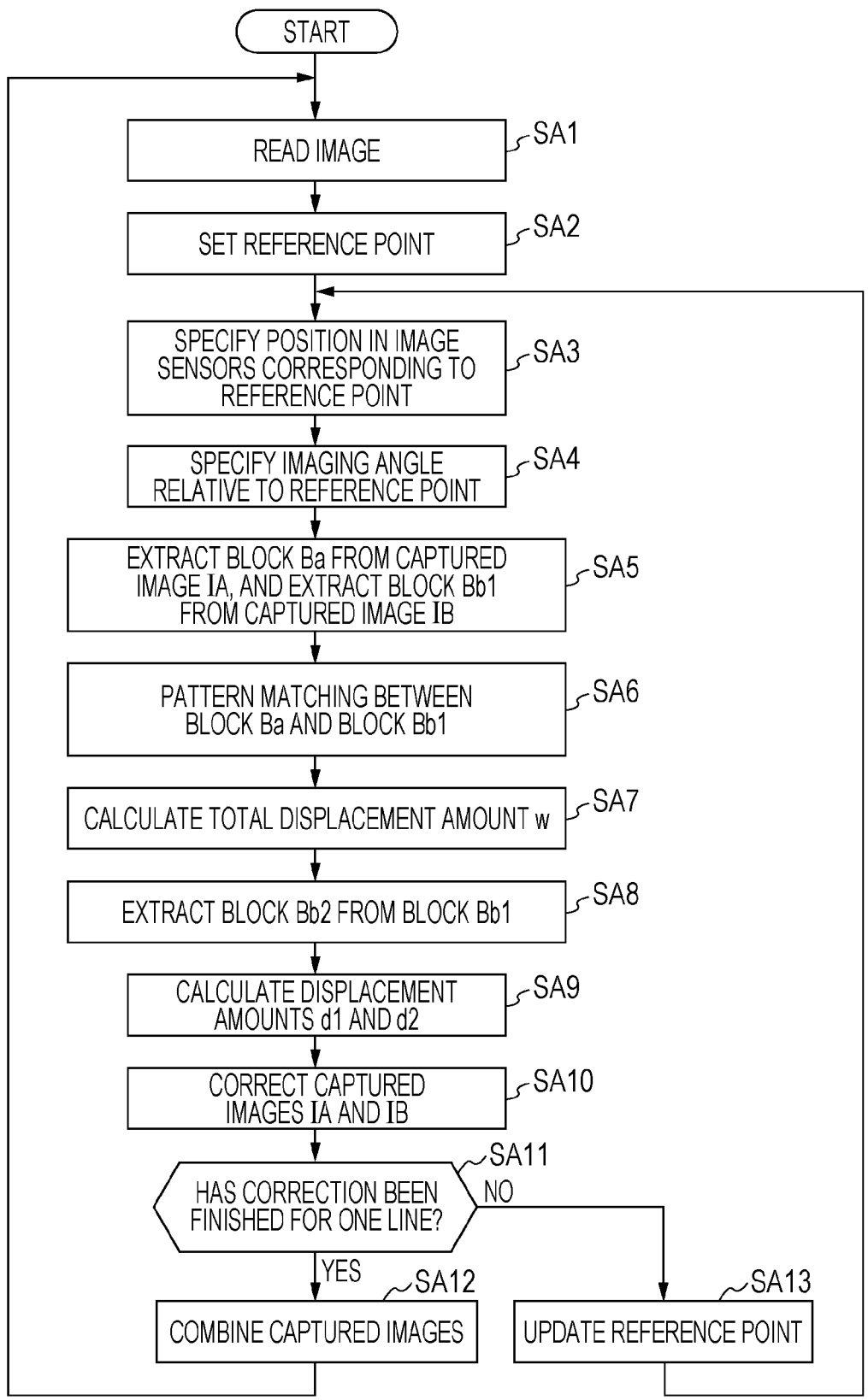
FIG. 7 is a flowchart illustrating operation of the image reading apparatus.

FIG. 7 is a flowchart illustrating operation of the image reading apparatus 1. The process illustrated in FIG. 7 is performed repeatedly while the image reading apparatus 1 is reading an image from a document. In step SA1, the controller 101 reads an image for one line in the principal scanning direction from a document. Specifically, the controller 101 acquires a captured image via the plural optical imaging systems 16 arranged side by side in the principal scanning direction. The controller 101 stores the read image in the line buffer.

In step SA2, the controller 101 sets a reference point in a region in which the reading regions A of the adjacent optical imaging systems 16 overlap each other. The memory 102 stores an initial value of the reference point determined in advance. The controller 101 sets a reference point at a position indicated by the initial value stored in the memory 102.

In step SA3, the controller 101 specifies the position in the image sensors corresponding to the reference point in the optical imaging system 16. The wording "position in the image sensors corresponding to the reference point" represents in what pixel of the captured image in the principal scanning direction the reference point appears (i.e. the position of a pixel in the captured image in which the reference point appears). As discussed above, the reference point is set in a region in which the reading regions A of the adjacent optical imaging systems 16 overlap each other. Thus, the controller 101 specifies the position in the image sensors corresponding to the reference point for each of the line sensors 161 of the adjacent optical imaging systems 16. Specifically, the controller 101 specifies the position in the image sensors corresponding to the reference point using the function indicated by the following formula (4):

$$xpos(x)=[Sa,pixelA,Sb,pixelB] \qquad (4)$$

The function indicated by the formula (4) (hereinafter referred to as "function xpos(x)") is a function that outputs two optical imaging systems 16 and pixels in the optical imaging systems 16 corresponding to the position x on the reading surface in the principal scanning direction. That is, the function xpos(x) is a function that outputs pixelA of the optical imaging system 16Sa and pixelB of the optical imaging system 16Sb as the position in the image sensors corresponding to the position x. The function xpos(x) has been derived by performing calibration in the image reading apparatus 1 in advance and registered in the image reading apparatus 1 before the process illustrated in FIG. 7 is started. The calibration for deriving the function xpos(x) will be discussed later. The controller 101 stores the specified position of the image sensor in the RAM.

In step SA4, the controller 101 specifies the imaging angle a1 of the optical imaging system 16Sa relative to the reference point and the imaging angle a2 of the optical imaging system 16Sb relative to the reference point. Specifically, the controller 101 specifies the imaging angle relative to the reference point using the function indicated by the following formula (5):

$$ang(pixel)=[angle] \qquad (5)$$

The function indicated by the formula (5) (hereinafter referred to as "function ang(pixel)") is a function that outputs an imaging angle in response to input of a single pixel of the line sensor 161. The controller 101 inputs pixelA specified in step SA3 to the function ang(pixel) to specify the imaging angle a1. In addition, the controller 101 inputs pixelB specified in step SA3 to the function ang(pixel) to specify the imaging angle a2. The controller 101 stores the specified imaging angle a1 and imaging angle a2 in the RAM.

In step SA5, the controller 101 extracts blocks from the captured image IA from the optical imaging system 16Sa and the captured image IB from the optical imaging system 16Sb. The term "blocks" as used herein refers to partial regions in the captured images. Blocks are extracted for the purpose of pattern matching to be performed in step SA6 to be discussed later.

Figure 8:
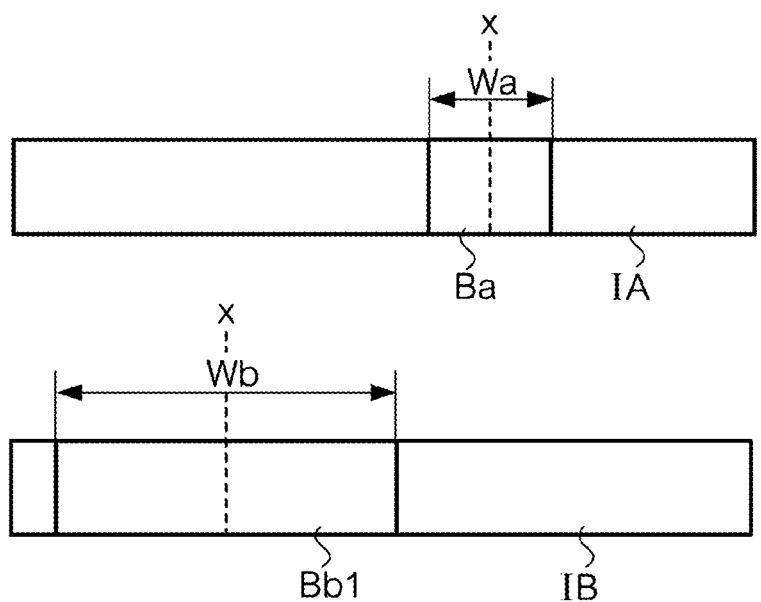
FIG. 8 illustrates block extraction.

FIG. 8 illustrates block extraction. In step SA5, the controller 101 extracts a block Ba having a width Wa determined in advance and centered on pixelA (reference point x) from the captured image IA from the optical imaging system 16Sa. In addition, the controller 101 extracts a block Bb1 having a width Wb determined in advance and centered on pixelB (reference point x) from the captured image IB from the optical imaging system 16Sb. As illustrated in FIG. 8, the width Wb is larger than the width Wa.

FIG. 7 is referenced again. In step SA6, the controller 101 performs pattern matching between the block Ba and the block Bb1 extracted in step SA5. The controller 101 calculates differences in tone value for pixels in the block Ba and pixels in the block Bb1 and calculates the sum of the absolute values of the differences to quantify the degree of coincidence between the two regions, for example. The controller 101 determines that patterns correspond to each other in the case where the sum of the absolute values of the differences is equal to or less than a threshold determined in advance.

Figure 9:
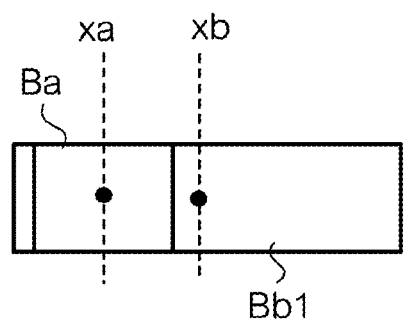
FIG. 9 illustrates pattern matching.

FIG. 9 illustrates pattern matching. In step SA6, when it is determined that patterns in the block Ba and the block Bb1 correspond to each other in a certain region of the block Bb1, the controller 101 specifies a position xa, in the principal scanning direction, of a pixel corresponding to pixelA and a position xb, in the principal scanning direction, of a pixel corresponding to pixelB in the block Bb1. The controller 101 stores the specified position xa and the specified position xb in the RAM. In the case where no displacement is caused in the captured images with no paper floating, the position xa and the position xb coincide with each other.

FIG. 7 is referenced again. In step SA7, the controller 101 calculates a total displacement amount w. Specifically, the controller 101 calculates a total displacement amount w using the following formula (6). The controller 101 stores the calculated total displacement amount w in the RAM.

$$w=xa-xb \qquad (6)$$

In step SA8, the controller 101 extracts a block Bb2 having a width Wa and centered on the position xa from the block Bb1. The extraction of the block Bb2 is performed in order to align regions in which displacement of the captured image is corrected in step SA10 to be discussed later between the captured image IA and the captured image IB. In step SA9, the controller 101 calculates a displacement amount d1 and a displacement amount d2. Specifically, the controller 101 calculates a displacement amount d1 and a displacement amount d2 by substituting the imaging angle specified in step SA4 and the total displacement amount w calculated in step SA7 into the formulas (2) and (3) discussed above. The controller 101 stores the calculated displacement amount d1 and displacement amount d2 in the RAM.

In step SA10, the controller 101 corrects the captured image IA and the captured image IB. Specifically, the controller 101 corrects the position, in the principal scanning direction, of the block Ba in the captured image IA using the displacement amount d1 calculated in step SA9. In addition, the controller 101 corrects the position, in the principal scanning direction, of the block Bb2 in the captured image IB using the displacement amount d2 calculated in step SA9. The controller 101 corrects the block Ba and the block Bb2 through resampling, for example.

In step SA11, the controller 101 determines whether or not a correction has been finished for a captured image for one line. The controller 101 determines that a correction has been finished for an image for one line in the case where the reference point has reached a position determined in advance in the principal scanning direction, for example. In the case where it is determined that a correction has been finished for an image for one line (SA11: YES), the controller 101 proceeds to step SA12. In the case where it is determined that a correction has not been finished for an image for one line (SA11: NO), the controller 101 proceeds to step SA13.

In step SA12, the controller 101 combines the captured images for one line to generate a line image. To combine the captured images, the controller 101 performs one of the following processes (a) to (c), for example, for a region in which the reading regions A overlap each other.

(a) To select the tone value of a pixel in a captured image from one of the two adjacent optical imaging systems 16 with a smaller degree of field curvature.

For example, a case where the optical imaging system 16Sa provides a smaller degree of field curvature relative to the position x0 than that of the optical imaging system 16Sb is considered when combining the captured image IA from the optical imaging system 16Sa and the captured image IB from the optical imaging system 16Sb. In this case, the controller 101 selects, as the tone value of a pixel at the position x0, the tone value of a pixel in the captured image IA. In another example, a case where the optical imaging system 16Sb provides a smaller degree of field curvature relative to a position x3 which is different from the position x0 in a region in which the reading regions A overlap each other than that of the optical imaging system 16Sa is considered. In this case, the controller 101 selects, as the tone value of a pixel at the position x3, the tone value of a pixel in the captured image IB. In the case where the process (a) is performed, the controller 101 has stored in advance, in the memory 102, information that indicates an optical imaging system 16 with a smaller degree of field curvature than that of other optical imaging systems 16 for each position in the principal scanning direction. The controller 101 refers to the information stored in the memory 102, and selects the tone value of a pixel in a captured image from the optical imaging system 16 indicated in the information.

(b) To obtain a weighted average of the tone values of pixels in the two captured images from the two adjacent optical imaging systems 16 such that the weight of the tone value of a pixel in the captured image from one of the optical imaging systems 16 with a smaller degree of field curvature is larger than the weight of the tone value of a pixel in the captured image from the other optical imaging system 16.

For example, a case where the optical imaging system 16Sa provides a smaller degree of field curvature relative to the position x0 than that of the optical imaging system 16Sb is considered when combining the captured image IA from the optical imaging system 16Sa and the captured image IB from the optical imaging system 16Sb. In this case, the controller 101 obtains, as the tone value of a pixel at the position x0, a weighted average of the tone values of pixels in the captured images IA and IB with a larger weight given to the tone value of a pixel in the captured image IA than the weight given to the tone value of a pixel in the captured image IB. In another example, a case where the optical imaging system 16Sb provides a smaller degree of field curvature relative to a position x3 than that of the optical imaging system 16Sa is considered. In this case, the controller 101 obtains, as the tone value of a pixel at the position x3, a weighted average of the tone values of pixels in the captured images IA and IB with a larger weight given to the tone value of a pixel in the captured image IB than the weight given to the tone value of a pixel in the captured image IA. In the case where the process (b) is performed, the controller 101 has stored in advance, in the memory 102, the information described in (a) or information that indicates the degree of field curvature for each position in the principal scanning direction. The controller 101 refers to the information stored in the memory 102, and obtains a weighted average of the tone values of pixels in the two captured images.

(c) To obtain an arithmetic average of the tone values of pixels in images captured by the two adjacent optical imaging systems 16.

For example, a case where the tone value of a pixel at the position x0 in the captured image IA is "200" and the tone value of a pixel at the position x0 in the captured image IB is "198" is considered when combining the captured image IA from the optical imaging system 16Sa and the captured image IB from the optical imaging system 16Sb. In this case, the tone value of a pixel at the position x0 is calculated as "199".

In step SA13, the controller 101 updates the reference point. The controller 101 sets a new reference point with a predetermined space apart from the current reference point in the principal scanning direction, for example. As in step SA2, the new reference point is set in a region in which the reading regions A of the adjacent optical imaging systems 16 overlap each other. The controller 101 may set reference points continuously with no space in the principal scanning direction. Upon updating the reference point, the controller 101 proceeds to step SA3.

Figure 10:
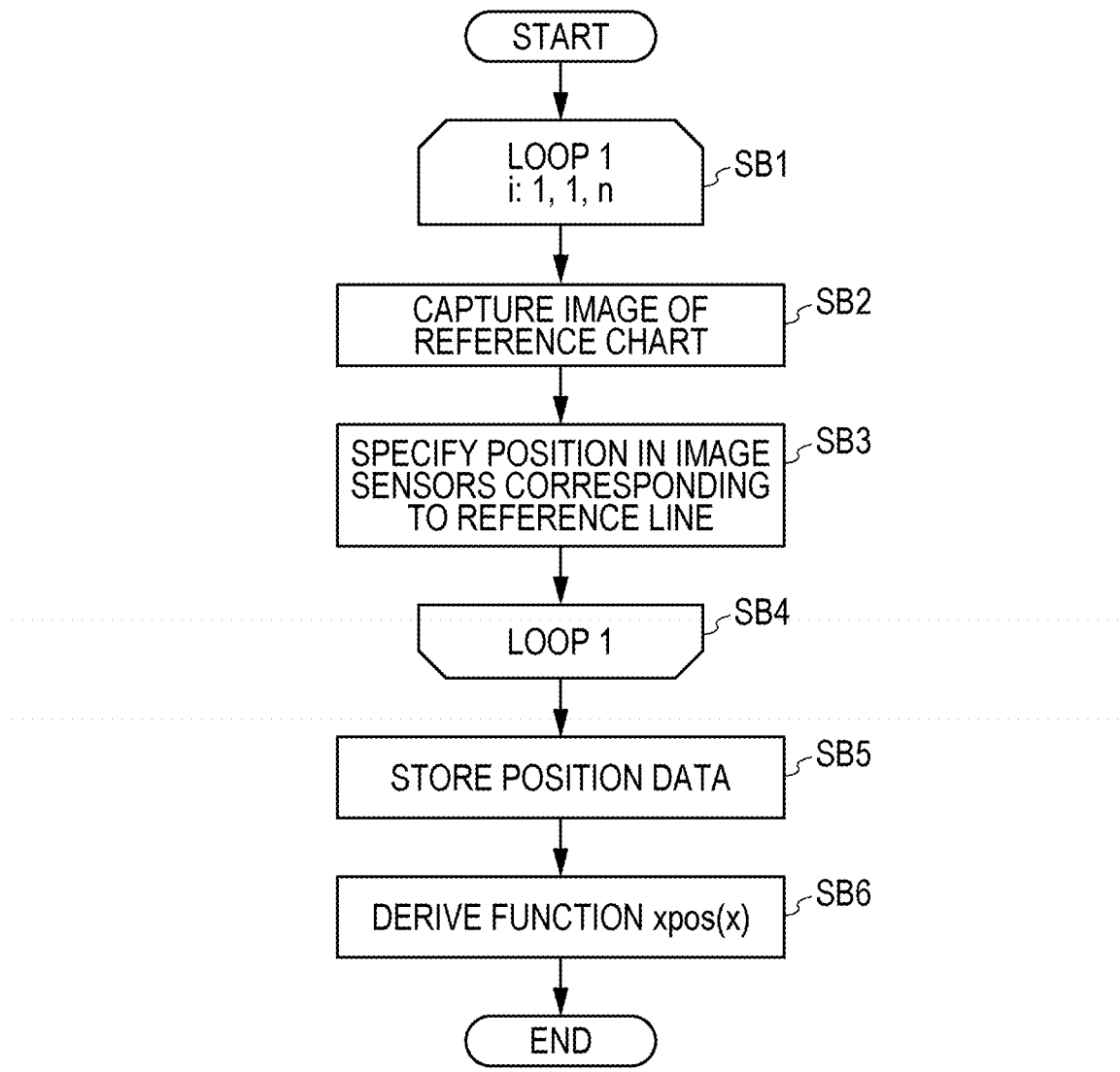
FIG. 10 is a flowchart illustrating calibration.

FIG. 10 is a flowchart illustrating calibration for deriving the function xpos(x). The calibration may be performed before shipment of the image reading apparatus 1, or may be performed for the purpose of correcting temporal fluctuations of the optical imaging system 16 when the image reading apparatus 1 is maintained after shipment. The calibration is performed by causing the image reading section 106 to read a figure (hereinafter referred to as "reference chart") determined in advance. Thus, the process illustrated in FIG. 10 is started with the reference chart placed at a position on the reading surface R at which the reference chart faces the optical imaging system 16.

Figure 11:
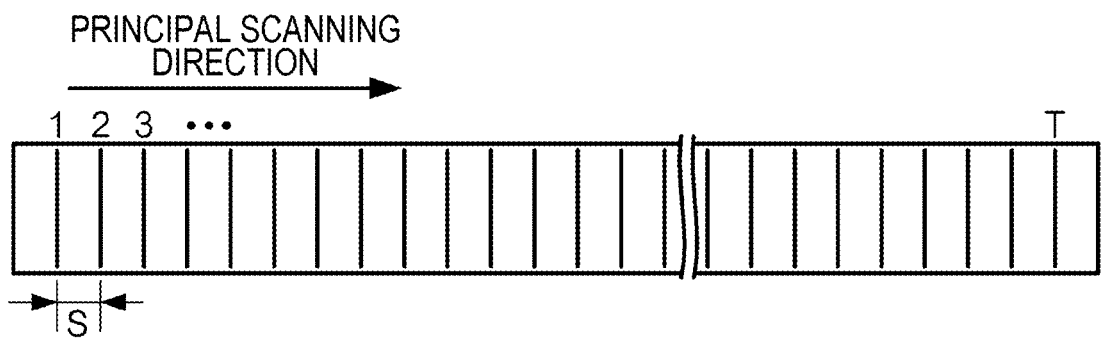
FIG. 11 illustrates a reference chart.

FIG. 11 illustrates a reference chart. The reference chart is a chart in which plural lines (hereinafter referred to as "reference lines") are drawn. In the example, the reference chart includes T reference lines arranged at intervals of a clearance S in the principal scanning direction. The clearance S is set such that it is possible to specify the number of a reference line that appears in a captured image of the reference chart in the principal scanning direction in the reference chart. The clearance S is also set such that plural reference lines appear in each of captured images from the optical imaging systems 16. The reference chart is not limited to that illustrated in FIG. 11. The reference chart may be a chart in which reference lines of different thicknesses are drawn, for example. The placement of the reference chart in the calibration is performed by placing a metal plate or a glass plate, to which paper with a printed reference chart has been affixed, at a position on the reading surface R at which the reference chart faces the optical imaging system 16, for example. In another example, the reference chart may be drawn in advance at a position on the reading surface R at which the reference chart faces the optical imaging system 16. In this case, in order to prevent the reference chart from being rubbed to fade away when the document is transported on the reading surface R, it is desirable that the reference chart should be retracted from a position at which the reference chart faces the optical imaging system 16 when the document is transported on the reading surface R. In a specific example, the reference chart may be drawn on a part of a side surface of a cylindrical roller that extends in the principal scanning direction, and the roller may be rotated such that the reference chart faces the optical imaging system 16 when the calibration is performed and the reference chart does not face the optical imaging system 16 when the calibration is not performed. In the example, the side surface of the roller which extends in the principal scanning direction corresponds to the reading surface R.

FIG. 10 is referenced again. In step SB1, the controller 101 initializes a loop counter i for a process loop 1. The loop counter i is a parameter that specifies an optical imaging system 16 that captures an image of the reference chart. In the example, the loop counter i is initialized with i=1. The loop counter i is incremented by one at a time at the loop end. In the example, the process loop 1 is repeated for the number of the optical imaging systems 16 arranged side by side in the principal scanning direction, that is, until i=n is met.

In step SB2, the controller 101 captures an image of the reference chart via the optical imaging system 16 specified by the loop counter i. For example, in the case where the loop counter i indicates i=1, the controller 101 captures an image of the reference chart via the optical imaging system 16S1. In another example, in the case where the loop counter i indicates i=2, the controller 101 captures an image of the reference chart via the optical imaging system 16S2. The controller 101 stores the captured image in the RAM.

In step SB3, the controller 101 specifies the position in the image sensors corresponding to the reference line. The wording "position in the image sensors corresponding to the reference line" represents in what pixel of the captured image in the principal scanning direction the reference line appears. The controller 101 specifies the position in the image sensors corresponding to the reference line by analyzing the captured image obtained in step SB2. Specifically, the controller 101 specifies a region in the captured image with a smaller tone value than that of other regions, and specifies a pixel at the center, in the principal scanning direction, of the specified region as the position in the image sensors corresponding to the reference line. As discussed above, plural reference lines appear in a captured image of the reference chart. The controller 101 specifies the position in the image sensors corresponding to each of the plural reference lines.

In step SB4, the controller 101 performs a process for the loop end of the process loop 1. Specifically, the controller 101 determines whether or not the loop counter i indicates i=n. If i=n is not met, the controller 101 increments the loop counter i, and proceeds to step SB1. If i=n is met, the controller 101 proceeds to step SB5. In step SB5, the controller 101 generates data (hereinafter referred to as "position data") that indicate, for each of the optical imaging systems 16, the position in the image sensors corresponding to the reference line specified through the processes in steps SB1 to SB4, and stores the generated data in the RAM.

FIGS. 12A and 12B illustrate position data. FIG. 12A illustrates position data represented in the table format, with the columns indicating the number that specifies the reference line and with the rows indicating the number that specifies the optical imaging system 16. FIG. 12B illustrates position data represented in the graph format, with the horizontal axis representing the number that specifies the reference line and with the vertical axis representing the position of the image sensor. FIG. 12B illustrates a part of the position data illustrated in FIG. 12A (specifically, position data for the optical imaging systems 16S1 to 16S3). In the example of FIGS. 12A and 12B, the line sensor 161 of the optical imaging system 16 includes image sensors for 7600 pixels. In the position data illustrated in FIGS. 12A and 12B, for example, the position in the image sensors corresponding to the first reference line is the 150-th pixel in the captured image from the optical imaging system 16S1. In another example, the position in the image sensors corresponding to the third reference line is the 3750-th pixel in the captured image from the optical imaging system 16S1, and the 140-th pixel in the captured image from the optical imaging system 16S2. In still another example, the position in the image sensors corresponding to the sixth reference line is the 6100-th pixel in the captured image from the optical imaging system 16S2, and the 2100-th pixel in the captured image from the optical imaging system 16S3.

FIG. 10 is referenced again. In step SB6, the controller 101 derives a function xpos(x) using the position data stored in the RAM. Specifically, the controller 101 performs an interpolation between discrete values indicated in the position data to specify the position in the image sensors corresponding to a position on the reading surface R in the principal scanning direction, and derives a function xpos(x) from the specified data. The controller 101 stores the derived function xpos(x) in the memory 102.

FIG. 13 illustrates an example of a scene in which the image reading apparatus 1 is used. In the example, the image reading apparatus 1 is used to evaluate the printing quality. Specifically, the image reading apparatus 1 evaluates the printing quality by comparing image data (hereinafter referred to as "read image data") acquired by reading a document with a printed image and image data (hereinafter referred to as "original image data") on the basis of which printing has been performed. In the example of FIG. 13, the image reading apparatus 1 divides an original image indicated by the original image data into a lattice, and performs pattern matching on individual compartments C with a read image indicated by the read image data. The pattern matching is performed by calculating a difference in tone value between a pixel in a compartment C and a pixel in a matching region J, which is set in the read image as centered on a coordinate corresponding to the center coordinate of the compartment C, within the range of the matching region J. The image reading apparatus 1 specifies, in the matching region J, a position c1 (hereinafter referred to as "maximum score position") at which the degree of coincidence with the compartment C is maximum, and evaluates the printing quality using displacement between a center point c0 of the matching region J and the maximum score position c1. In the case where the image reading apparatus 1 is used to evaluate the printing quality, the process for combining the captured images to generate a line image (step SA12) may be omitted.

The present invention is not limited to the exemplary embodiment described above, and a variety of modifications may be made. Some modifications will be described below. The modifications described below may be used in combination of two or more.

In the pattern matching in step SA6, it is possibly determined that the block Ba does not correspond to any of the regions in the block Bb1. In this case, in step SA7, the controller 101 may estimate a current total displacement amount w (hereinafter referred to as "total displacement amount $w_n$") using at least one of a total displacement amount w obtained in the preceding calculation (hereinafter referred to as "total displacement amount $w_{n-1}$") and a total displacement amount w obtained in the next calculation (hereinafter referred to as "total displacement amount $w_{n+1}$"). The estimation of the total displacement amount $w_n$ is performed by calculating the average value of the total displacement amount $w_{n-1}$ and the total displacement amount $w_{n+1}$. In another example, the total displacement amount $w_{n-1}$ may be used as the total displacement amount $w_n$.

The controller 101 may correct the total displacement amount $w_n$ calculated in step SA7 before performing the process in step SA9. For example, the controller 101 may correct the total displacement amount $w_n$ in the case where the difference between the total displacement amount $w_n$ and the total displacement amount $w_{n-1}$ exceeds a threshold determined in advance. In another example, the controller 101 may derive a function for estimating the next total displacement amount w on the basis of plural total displacement amounts w calculated in the past, and correct the total displacement amount $w_n$ in the case where the difference between a value estimated on the basis of the function and the total displacement amount $w_n$ exceeds a threshold determined in advance. The correction of the total displacement amount $w_n$ is performed by calculating the average value of the total displacement amount $w_{n-1}$ and the total displacement amount $w_{n+1}$. In another example, a value estimated on the basis of the function discussed above may be used as the total displacement amount $w_n$.

A part of a region in the principal scanning direction occupied by the block Ba extracted in step SA5 may overlap, or may not overlap, the block Ba obtained in the preceding extraction.

One reference point may be provided for each line. In this case, the controller 101 may correct a captured image for one line, when a displacement amount d1 and a displacement amount d2 are calculated, using the displacement amounts d1 and d2.

The process in FIG. 7 may not be performed for each line in the principal scanning direction. The process in FIG. 7 may be performed for every plural lines in the principal scanning direction. In this case, the RAM includes a line buffer that stores an image for plural lines.

A control program executed by the image reading apparatus 1 in the exemplary embodiment may be provided as stored in a computer readable recording medium such as a magnetic recording medium (such as a magnetic tape and a magnetic disk (such as an HDD and a flexible disk (FD))), an optical recording medium (such as an optical disk (such as a compact disk (CD) and a digital versatile disk (DVD))), a magneto-optical recording medium, and a semiconductor memory (such as a flash ROM). Alternatively, the program may be downloaded by way of a network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
    at least one hardware processor configured to implement:
        a reading unit that reads an image from a recording medium via a first optical imaging system and a second optical imaging system, the first optical imaging system and the second optical imaging system being disposed such that respective reading regions partially overlap each other in a principal scanning direction on a reading surface of the image reading apparatus;
        a first calculation unit that calculates a sum of a distance over which a first image captured by the first optical imaging system is displaced in the principal scanning direction with respect to a reference point and a distance over which a second image captured by the second optical imaging system is displaced in the principal scanning direction with respect to the reference point, the reference point being included in a region in which the reading regions overlap each other on the reading surface;
        a second calculation unit that calculates a first distance, over which the first image is displaced in the principal scanning direction, and a second distance, over which the second image is displaced in the principal scanning direction, by weighting the sum calculated by the first calculation unit by a first reading angle, at which the first optical imaging system reads the reference point, and by a second reading angle at which the second optical imaging system reads the reference point; and
        a correction unit that corrects a position of the first image in the principal scanning direction using the first distance calculated by the second calculation unit, and that corrects a position of the second image in the principal scanning direction using the second distance calculated by the second calculation unit,
    wherein the second calculation unit is further configured to calculate the first distance by weighting the sum by a ratio of the first reading angle to a sum of the first reading angle and the second reading angle.

2. The image reading device according to claim 1,
    wherein the second calculation unit specifies the first reading angle on the basis of a position of a pixel in which the reference point appears in the first image, and specifies the second reading angle on the basis of a position of a pixel in which the reference point appears in the second image.

3. The image reading apparatus according to claim 1, wherein the at least one hardware processor is further configured to implement:
    a combining unit that combines the first image and the second image after being corrected by the correction unit.

4. The image reading device according to claim 3,
    wherein the combining unit combines the first image and the second image by selecting a tone value of a pixel in an image captured by one of the first optical imaging system and the second optical imaging system with a smaller degree of field curvature for a region in which the reading regions overlap each other.

5. The image reading device according to claim 3,
    wherein the combining unit combines the first image and the second image by obtaining a weighted average of a tone value of a pixel in the first image and a tone value of a pixel in the second image such that a weight of a tone value of a pixel in an image captured by one of the first optical imaging system and the second optical imaging system with a smaller degree of field curvature is larger than a weight of a tone value of a pixel in an image captured by the other optical imaging system for a region in which the reading regions overlap each other.

6. The image reading device according to claim 3, wherein the combining unit combines the first image and the second image by obtaining an arithmetic average of a tone value of a pixel in the first image and a tone value of a pixel in the second image for a region in which the reading regions overlap each other.

7. The image reading apparatus according to claim 1, wherein the at least one hardware processor is further configured to implement:
a transport unit that transports the recording medium with the recording medium facing the reading surface.

8. The image reading device according to claim 1, wherein the second calculation unit is further configured to calculate the first distance according to:

$$d1 = w * \frac{a1}{a1 + a2}$$

wherein d1 is the first distance,
wherein w is the sum calculated by the first calculation unit,
wherein a1 is the first reading angle, and
wherein a2 is the second reading angle.

9. The image reading device according to claim 8, wherein the second calculation unit is further configured to calculate the second distance according to:

$$d2 = w * \frac{a2}{a1 + a2}$$

wherein d2 is the second distance.

10. An image reading method comprising:
reading an image from a recording medium via a first optical imaging system and a second optical imaging system, the first optical imaging system and the second optical imaging system being disposed such that respective reading regions partially overlap each other in a principal scanning direction on a reading surface;
calculating a sum of a distance over which a first image captured by the first optical imaging system is displaced in the principal scanning direction with respect to a reference point and a distance over which a second image captured by the second optical imaging system is displaced in the principal scanning direction with respect to the reference point, the reference point being included in a region in which the reading regions overlap each other on the reading surface;
calculating a first distance, over which the first image is displaced in the principal scanning direction, and a second distance, over which the second image is displaced in the principal scanning direction, by weighting the sum by a first reading angle, at which the first optical imaging system reads the reference point, and by a second reading angle at which the second optical imaging system reads the reference point; and
correcting a position of the first image in the principal scanning direction using the first distance, and correcting a position of the second image in the principal scanning direction using the second distance,
wherein calculating the first distance further comprises weighting the sum by a ratio of the first reading angle to a sum of the first reading angle and the second reading angle.

11. A non-transitory computer readable medium storing a program causing a computer to execute a process comprising:
reading an image from a recording medium via a first optical imaging system and a second optical imaging system, the first optical imaging system and the second optical imaging system being disposed such that respective reading regions partially overlap each other in a principal scanning direction on a reading surface;
calculating a sum of a distance over which a first image captured by the first optical imaging system is displaced in the principal scanning direction with respect to a reference point and a distance over which a second image captured by the second optical imaging system is displaced in the principal scanning direction with respect to the reference point, the reference point being included in a region in which the reading regions overlap each other on the reading surface;
calculating a first distance, over which the first image is displaced in the principal scanning direction, and a second distance, over which the second image is displaced in the principal scanning direction, by weighting the sum by a first reading angle at which the first optical imaging system reads the reference point, and by a second reading angle at which the second optical imaging system reads the reference point; and
correcting a position of the first image in the principal scanning direction using the first distance, and correcting a position of the second image in the principal scanning direction using the second distance,
wherein calculating the first distance further comprises weighting the sum by a ratio of the first reading angle to a sum of the first reading angle and the second reading angle.

* * * * *